United States Patent
Hsu et al.

(10) Patent No.: US 11,227,175 B2
(45) Date of Patent: Jan. 18, 2022

(54) METHOD AND SYSTEM FOR AUTOMATIC LICENSE-PLATE RECOGNITION

(71) Applicant: MERIT LILIN ENT. CO., LTD., New Taipei (TW)

(72) Inventors: Cheng-Chung Hsu, New Taipei (TW); Chih-Kang Hu, New Taipei (TW); Chi-Yen Cheng, New Taipei (TW); Hong-Wei Chao, New Taipei (TW)

(73) Assignee: Merit Lilin Ent. Co., Ltd., New Taipei (TW)

(*) Notice: Subject to any disclaimer, the term of this patent is extended or adjusted under 35 U.S.C. 154(b) by 191 days.

(21) Appl. No.: 16/809,677

(22) Filed: Mar. 5, 2020

(65) Prior Publication Data
US 2021/0004626 A1     Jan. 7, 2021

(30) Foreign Application Priority Data
Jul. 3, 2019   (TW) ................... 108123375

(51) Int. Cl.
*G06K 9/32*      (2006.01)
*B60R 13/10*     (2006.01)

(52) U.S. Cl.
CPC ............ *G06K 9/3258* (2013.01); *B60R 13/10* (2013.01)

(58) Field of Classification Search
CPC ........... G06K 2209/01; G06K 9/00469; G06K 9/3283; G06K 9/18; G06K 9/03; G06K 9/32; G06K 9/3258; G06K 9/3275; G06K 9/6821; H04N 1/3878
See application file for complete search history.

(56) References Cited

U.S. PATENT DOCUMENTS

| | | | | |
|---|---|---|---|---|
| 5,187,753 A * | 2/1993 | Bloomberg | .......... | G06K 9/3283 345/657 |
| 5,506,918 A * | 4/1996 | Ishitani | ............... | G06K 9/3283 382/173 |
| 5,517,587 A * | 5/1996 | Baker | .................. | G06K 9/3283 235/462.1 |
| 5,687,253 A * | 11/1997 | Huttenlocher | ....... | G06K 9/6206 382/177 |
| 7,065,261 B1 * | 6/2006 | Horie | ................... | G06K 9/3283 348/E5.055 |

(Continued)

OTHER PUBLICATIONS

Bodade et al., "A Novel Approach for Automated Skew Correction of Vehicle Number Plate Using Principal Component Analysis" (Year: 2013).*

(Continued)

*Primary Examiner* — Dung Hong
(74) *Attorney, Agent, or Firm* — Michael Best & Friedrich LLP

(57) ABSTRACT

A method for performing automatic license plate recognition includes: performing character detection on a to-be-processed image; when a number of character objects constituting characters of a license plate are detected, obtaining a representative point for each character object; calculating a pattern line with respect to the character objects; calculating a skew angle defined by the pattern line and a preset reference line; rotating each character object based on the skew angle to obtain an adjusted image; and performing character recognition on the adjusted image to obtain a recognized character for each character object.

10 Claims, 6 Drawing Sheets

(56) References Cited

U.S. PATENT DOCUMENTS

| | | | | |
|---|---|---|---|---|
| 8,478,020 | B1* | 7/2013 | Jones | G07F 19/207 |
| | | | | 382/137 |
| 10,244,144 | B1* | 3/2019 | Kodimer | H04N 1/00809 |
| 2012/0134588 | A1* | 5/2012 | Zhang | G06K 9/3275 |
| | | | | 382/176 |
| 2014/0161365 | A1* | 6/2014 | Acharya | G06K 9/3283 |
| | | | | 382/229 |
| 2015/0146992 | A1* | 5/2015 | Yeom | G06K 9/3283 |
| | | | | 382/229 |
| 2016/0259974 | A1* | 9/2016 | Macciola | G06K 9/325 |
| 2017/0024626 | A1* | 1/2017 | Inaba | G06K 9/00724 |
| 2018/0300578 | A1* | 10/2018 | Wilbert | G06K 9/00671 |
| 2020/0401834 | A1* | 12/2020 | Das | G06K 9/3283 |
| 2021/0256284 | A1* | 8/2021 | Subbaraya | G06K 9/3275 |

OTHER PUBLICATIONS

Arafat et al., "A Vehicular License Plate Recognition Framework For Skewed Images" (Year: 2018).*

Khalifa et al., "Malaysian Vehicle License Plate Recognition" (Year: 2006).*

* cited by examiner

METHOD AND SYSTEM FOR AUTOMATIC LICENSE-PLATE RECOGNITION

CROSS-REFERENCE TO RELATED APPLICATION

This application claims priority of Taiwanese Patent Application No. 108123375, filed on Jul. 3, 2019.

FIELD

The disclosure relates to a method and a system for performing automatic license-plate recognition.

BACKGROUND

Conventionally, a number of techniques have been implemented in the field of automatic license-plate recognition (ALPR), which involves using an electronic device to automatically recognize a license plate of a vehicle included in an image, and to recognize a plurality of characters (e.g., an alphabet, a number, a symbol, etc.) that constitute a plate number on the license plate.

Common difficulties encountered by the ALPR or common factors that may affect the outcomes, efficiency, or accuracy of the ALPR include: (1) that a color of the license plate may be similar to a color of another component of the vehicle (e.g., a bumper) or the background; (2) recognition at nighttime or in a relatively dim environment; (3) that the license plates or the characters thereon may come in different colors; (4) presence of objects that resemble certain characters and/or non-license plate objects that include certain characters in the proximity of the license plate in the image; and (5) that the license plate in the image may be skewed.

SUMMARY

One object of the disclosure is to provide a method that is capable of performing automatic license plate recognition.

According to one embodiment of the disclosure, the method includes:

a) performing a character detection operation on a to-be-processed image;

b) determining whether a number of character objects are detected based on a result of step a);

c) when the determination of step b) is affirmative, obtaining, for each of the character objects, a representative point associated with the character object;

d) obtaining a pattern line with respect to the representative points that are associated with the character objects, respectively;

e) calculating a skew angle formed by the pattern line and a preset reference line;

f) rotating each of the character objects based on the skew angle to obtain an adjusted object corresponding to the character object; and g) for each of the adjusted objects obtained respectively from the character objects, performing a character recognition operation on the adjusted object to obtain a recognized character.

Another object of the disclosure is to provide a system that is configured to performing the above-mentioned method.

According to one embodiment of the disclosure, the system includes . . . .

An electronic device for performing automatic license plate recognition, comprising a processor that is programmed to:

perform a character detection operation on a to-be-processed image;

determine whether a number of character objects are detected based on a result of the character detection operation, and, when the determination is affirmative, obtain, for each of the character objects, a representative point associated with the character object;

obtain a pattern line with respect to the representative points that are associated with the character objects, respectively;

calculate a skew angle formed by the pattern line and a preset reference line;

rotate each of the character objects based on the skew angle to obtain an adjusted object corresponding to the character object; and for each of the adjusted objects obtained respectively from the character objects, performing a character recognition operation on the adjusted object to obtain a recognized character.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
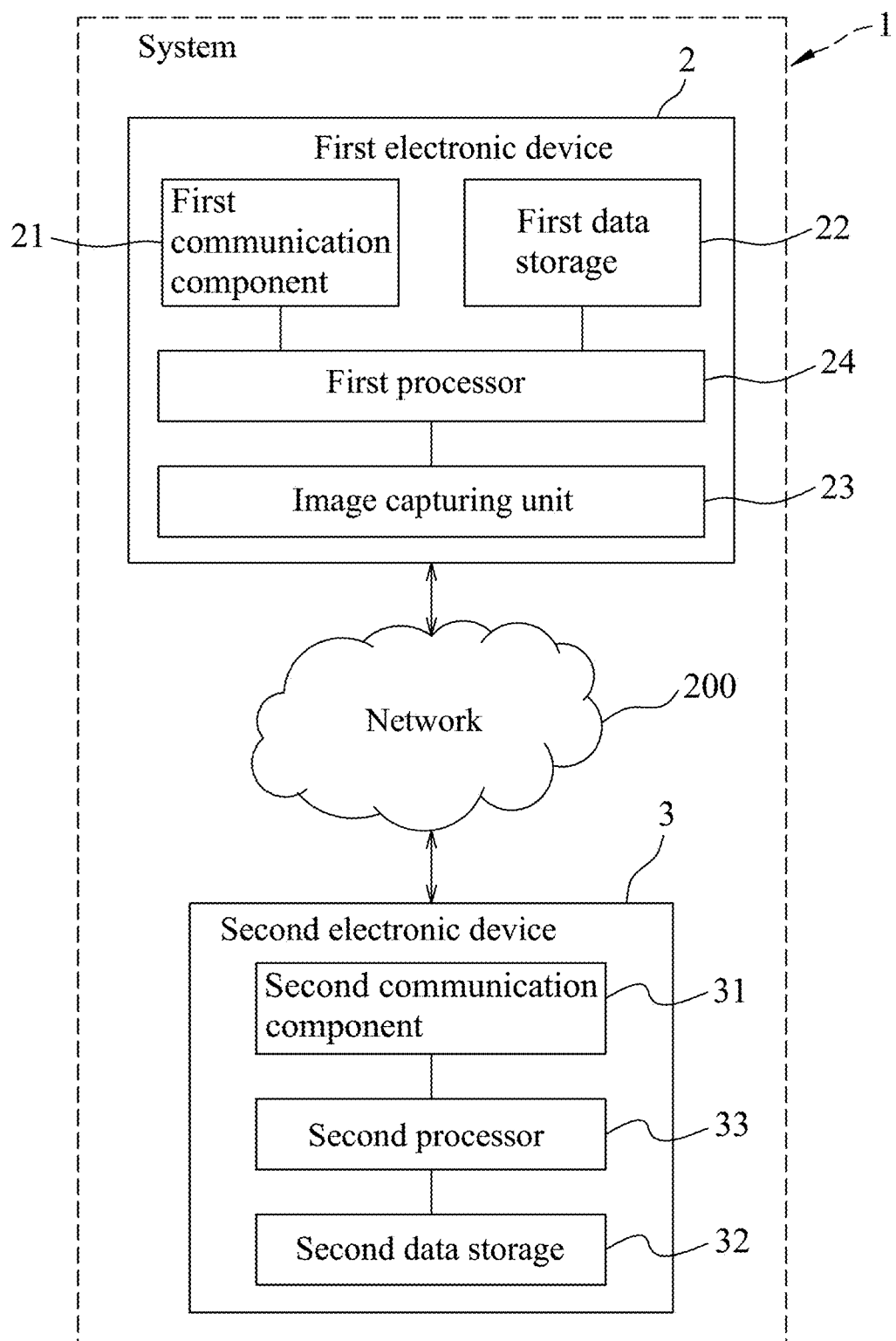
FIG. 1 is a block diagram illustrating a system for performing automatic license plate recognition (ALPR) according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating a system 1 for performing automatic license-plate recognition (ALPR) according to one embodiment of the disclosure.

In this embodiment, the system 1 includes a first electronic device 2 and a second electronic device 3 that are configured to communicate with each other via a network 200 (e.g., the Internet).

The first electronic device 2 may be embodied using a personal computer, a laptop, a tablet, a mobile electronic device such as a smartphone, or other forms of electronic device. In some examples, the first electronic device 2 may be a computer that is disposed at a side of a road or above the road, or in a parking lot.

The first electronic device 2 includes a first communication component 21, a first data storage 22, an image capturing unit 23 and a first processor 24.

The first processor 24 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The first communication component 21 is electrically connected to the first processor 24, and may include a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fourth generation (4G) of wireless mobile telecommunications technology, and/or the like.

The image capturing unit 23 is electrically connected to the first processor 24, and may be embodied using various types of digital image capturing devices that are capable of capturing images, such as a still camera, with a continuous shooting mode (also known as a burst mode) for rapidly capturing a plurality of images in succession. For example, in a case that the system 1 is disposed in a parking lot, the image capturing unit 23 may be disposed at an entrance to the parking lot for capturing an image of a vehicle about to enter the parking lot.

The first data storage 22 is electrically connected to the first processor 24, and may be embodied using flash memory, a hard disk, a solid state disk (SSD) or other types of non-transitory storage medium. The first data storage 22 stores a software application, a vehicle detection module, a license plate detection module and a character detection module. The software application includes instructions that, when executed by the first processor 24, cause the first processor 24 to perform a number of functions as described in the succeeding paragraphs. In this embodiment, the vehicle detection module, the license plate detection module and the character detection module are software modules respectively for detecting a vehicle, a license plate and a character in an image, and may be trained using mask R-CNN (region-based convolutional neural networks) and respective training materials.

Specifically, the training material used for training the vehicle detection module may be a plurality of data sets each including an image that has a vehicle, and position data that indicates a position of the vehicle in the image. The training material used for training the license detection module may be a plurality of data sets each including an image that has a vehicle with a license plate mounted thereon, and position data that indicates a position of the license plate in the image. The training material used for training the character detection module may be a plurality of data sets each including an image that has a vehicle with a license plate mounted thereon, and position data that indicates positions respectively of a number of characters constituting a license number of the license plate in the image.

In other embodiments, the vehicle detection module, the license plate detection module and the character detection module may be trained using R-CNN, fast R-CNN, Faster R-CNN, you only look once (YOLO), etc.

The second electronic device 3 may be embodied using a personal computer, a laptop, a tablet, a mobile electronic device such as a smartphone, or other forms of electronic device. In this embodiment, the second electronic device 3 may be a server computer.

The second electronic device 3 includes a second communication component 31, a second data storage 32, and a second processor 33.

The second communication component 31 is electrically connected to the second processor 33, and, similar to the first communication component 21, may include a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G) and/or fourth generation (4G) of wireless mobile telecommunications technology, and/or the like.

The second data storage 32 is electrically connected to the second processor 33, is similar to the first data storage 22, and may be embodied using flash memory, a hard disk, a solid state disk (SSD) or other types of non-transitory storage medium. The second data storage 32 also stores the software application, the vehicle detection module, the license plate detection module and the character detection module as described above.

The second processor 33 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

It is noted that in some embodiments, the system 1 may include a plurality of the first electronic devices 2 that are disposed at various locations (e.g., above multiple roads, at different parking sites, etc.) for different applications needing ALPR, and that are all in communication with the second electronic device 3.

Figure 2A:
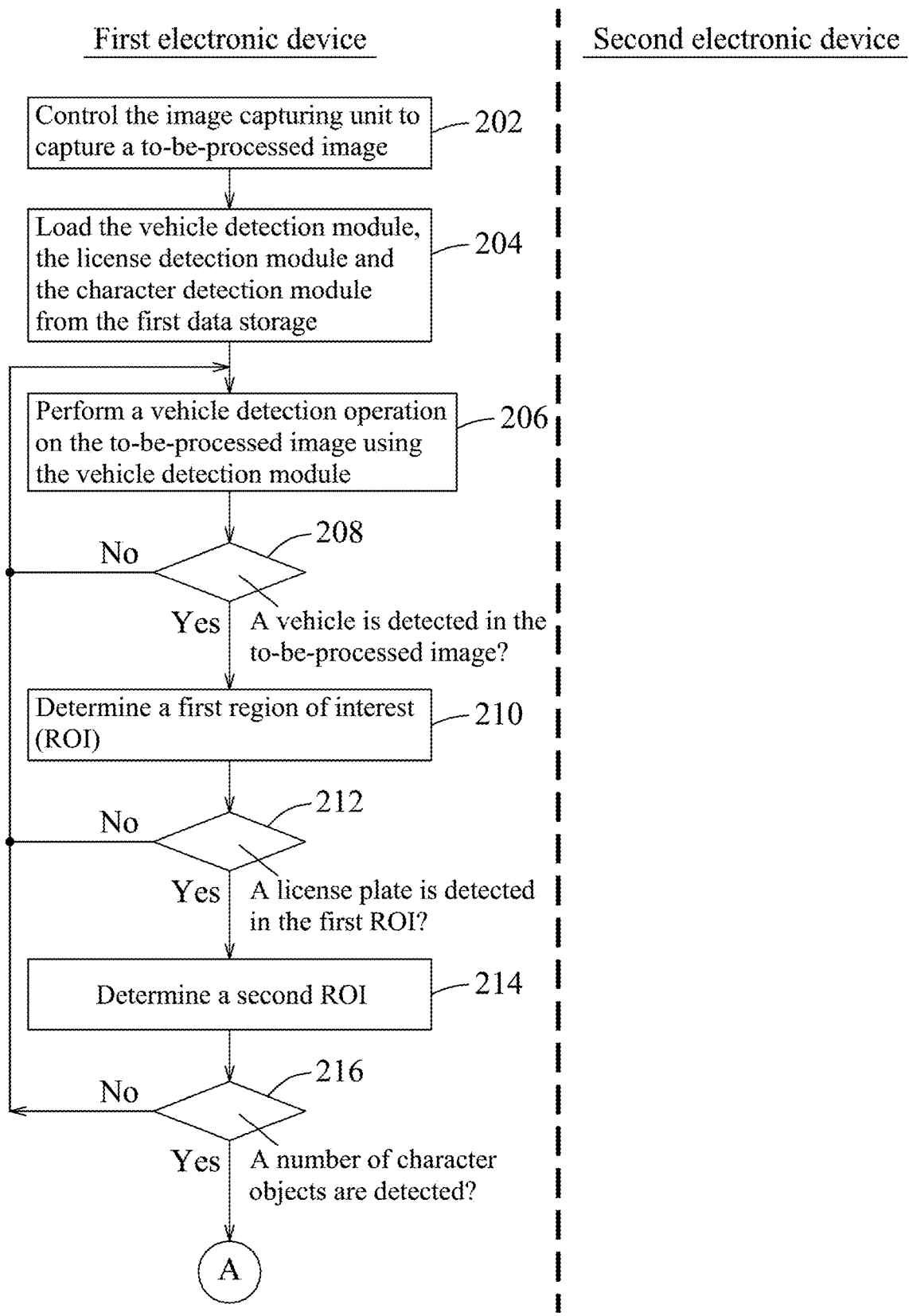
FIG. 2 is a flow chart illustrating steps of a method for performing ALPR according to one embodiment of the disclosure.
Figure 2B:
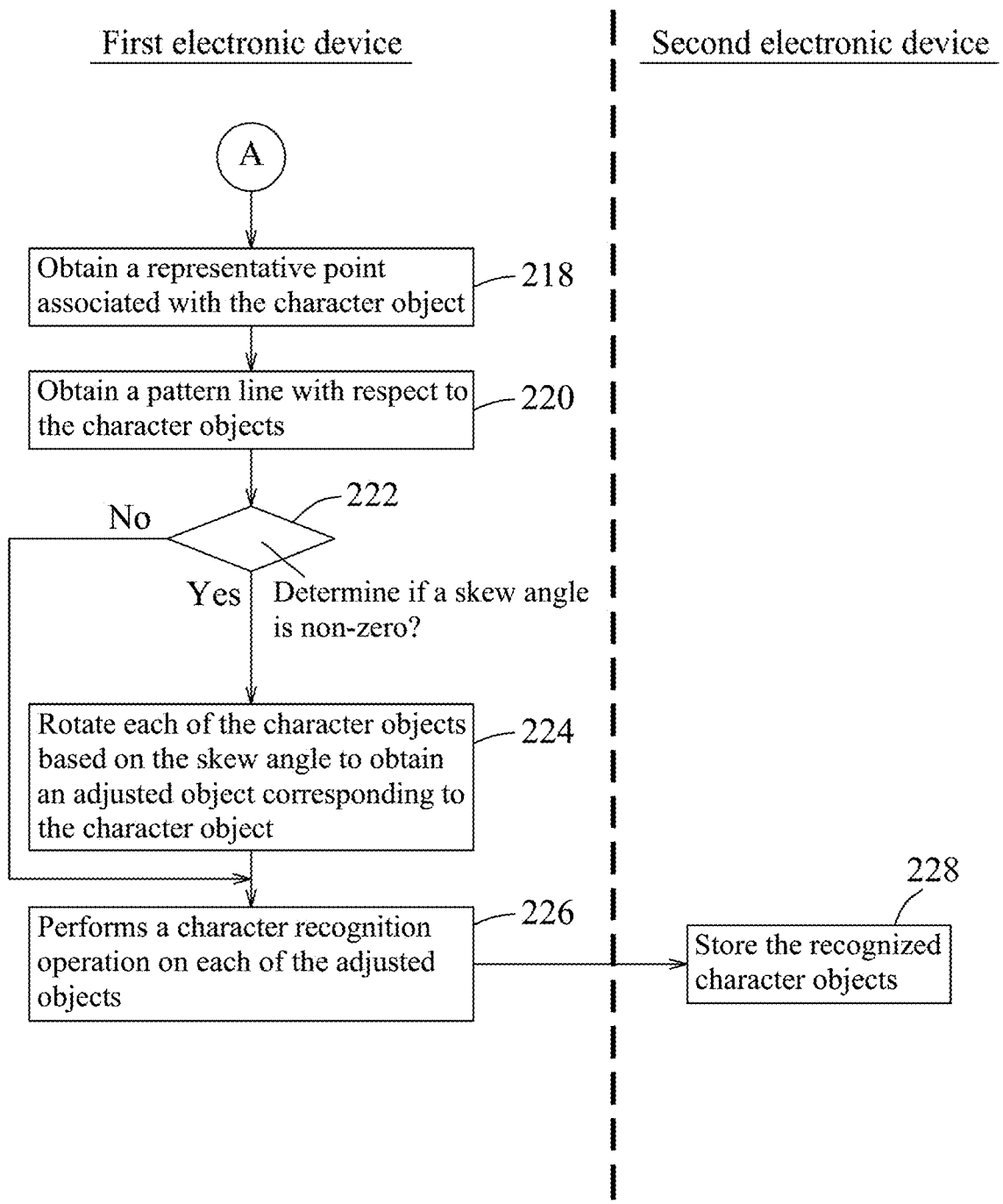

FIG. 2 is a flow chart illustrating steps of a method for performing ALPR according to one embodiment of the disclosure. In this embodiment, the method is implemented by the system 1 as shown in FIG. 1.

In step 202, the first processor 24 controls the image capturing unit 23 to capture a to-be-processed image. It is noted that the to-be-processed image may include a vehicle with a license plate mounted thereon. The license plate may include one or more characters (e.g., an alphabet, a number, a symbol, etc.) that constitute a plate number.

In step 204, the first processor 24 loads the vehicle detection module, the license detection module and the character detection module from the first data storage 22.

Then, the first processor 24 performs a vehicle detection operation on the to-be-processed image using the vehicle detection module in step 206, and determines whether a vehicle is detected in the to-be-processed image according to a result of the vehicle detection operation in step 208.

When it is determined, in step 208, that at least one vehicle is detected in the to-be-processed image, the flow proceeds to step 210. Otherwise, step 206 may be repeated for another to-be-processed image, or the method may be terminated when there are no more to-be-processed image awaiting processing.

In step 210, the first processor 24 determines a first region of interest (ROI) of the image, wherein the first ROI includes the vehicle, and performs a license plate detection operation on the first ROI using the license plate detection module. The first ROI may be defined as a rectangular portion of the to-be-processed image, wherein the rectangular portion encompasses the vehicle, and may be represented in a metadata format including an original coordinate point that represents one vertex of the rectangular portion, a length (a longitudinal distance represented in pixels), and a width (a horizontal distance represented in pixels).

In step 212, the first processor 24 determines whether a license plate is detected in the first ROI according to a result of the license plate detection operation.

When it is determined, in step 212, that a license plate is detected in the first ROI, the flow proceeds to step 214. Otherwise, the flow may go back to step 206 for another to-be-processed image, or the method may be terminated when there are no more to-be-processed image awaiting processing.

In step 214, the first processor 24 determines a second region of interest (ROI) within the first ROI, wherein the second ROI includes the license plate, and performs a character detection operation on the second ROI using the character detection module. The second ROI may be defined as a rectangular portion of the first ROI, where the rectangular portion encompasses the license plate, and is represented in a metadata format similar to the first ROI.

In step 216, the first processor 24 determines whether a number of character objects are detected based on a result of the character detection operation of step 214.

When the determination of step 216 is affirmative, the flow proceeds to step 218. Otherwise, the flow may go back to step 206 for another to-be-processed image, or the method may be terminated when there are no more to-be-processed image awaiting processing.

After the character objects are detected in the second ROI, the first processor 24 is further configured to determine a plurality of third region of interests (ROIs) containing the character objects, respectively. Each of the third ROIs may be defined as a rectangular portion in the second ROI to contain a corresponding one of the character objects, and is represented in a metadata format similar to the first ROI.

Figure 3:
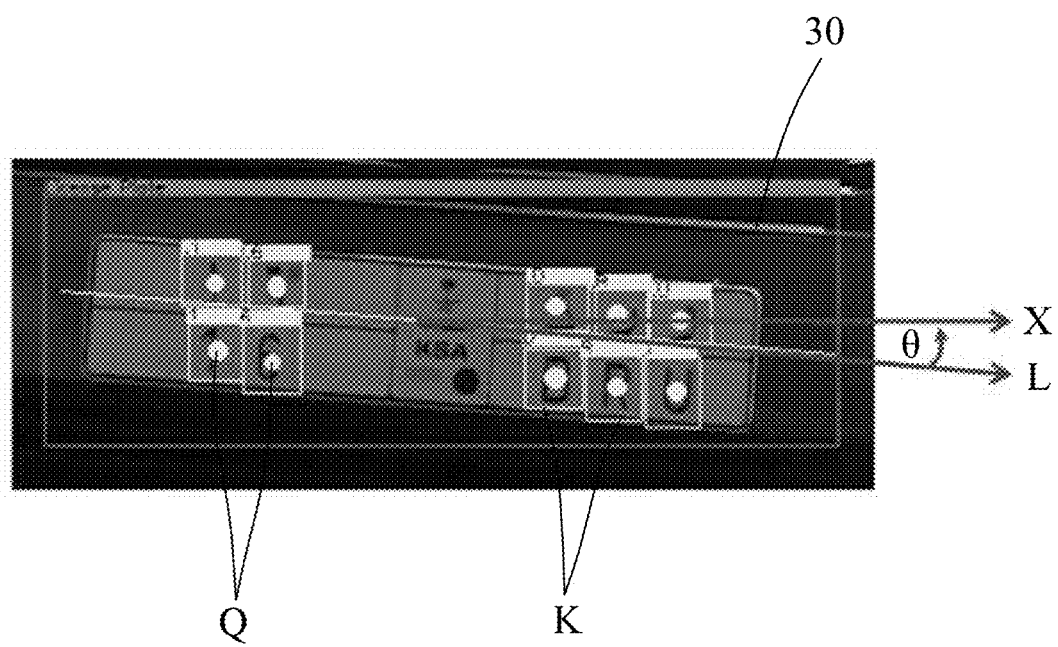
FIG. 3 illustrates an exemplary part of an image that contains a license plate.

FIG. 3 illustrates an exemplary second ROI (defined by a gray rectangular boundary) that contains a license plate 30. A number of third ROIs (K) (each defined by a white boundary) are identified in the second ROI.

In step 218, for each of the character objects, the first processor 24 obtains a representative point associated with the character object. In this embodiment, the representative point for a character object is defined as a center point (Q) of the corresponding third ROI (K) that contains such character object.

In step 220, the first processor 24 obtains a pattern line with respect to the character objects. In this embodiment, the pattern line is a regression line with respect to the representative points. Specifically, in the example as shown in FIG. 3, a pattern line (L) is a regression line with respect to the center points (Q) respectively of the third ROIs (K). In this embodiment, the regression line may be fitted to the center points (Q) using the least squares approach with the center points (Q) serving as variables. In other embodiments, various known method for finding the regression line may be utilized.

The pattern line (e.g., the regression line) is for determining whether the license plate in the to-be-processed image is in a skewed state (e.g., tilted at an angle). In such cases, recognition of the character objects may be adversely affected.

In step 222, the first processor 24 calculates a skew angle formed by the pattern line and a preset reference line. In the example as shown in FIG. 3, the preset reference line is a horizontal line (X), and the skew angle (θ) can be calculated as an included angle between the pattern line and the preset reference line.

In step 224, the first processor 24 rotates each of the character objects based on the skew angle to obtain an adjusted object corresponding to the character object. That is to say, in this embodiment, the first processor 24 is configured, for each of the character objects, to rotate the third ROI containing the character object based on the skew angle to obtain an adjusted ROI to serve as the corresponding adjusted object.

Specifically, the first processor 24 may rotate each of the character objects by an inverse of the skew angle. In the example as shown in FIG. 3, the skew angle (θ) may be minus 15 degrees, and as such, the first processor 24 rotates each of the character objects by 15 degrees (such that the pattern line (L) becomes parallel to the preset reference line).

In this embodiment, the rotating may be done using a rotation matrix (R) as shown below:

$$R = \begin{bmatrix} \cos\theta & -\sin\theta \\ \sin\theta & \cos\theta \end{bmatrix}$$

In this case, a data point in the third ROI with a position indicated by a set of coordinates (x, y) in a two-dimensional Cartesian coordinate system may be "rotated" by multiplying the rotation matrix (R) by the set of coordinates (x, y) of the data point represented as a column vector, shown in the following equation:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

where (x', y') represents the new position of the data point after the rotation, i.e., the position of said data point in the adjusted ROI.

Afterward, in step 226, the first processor 24 performs a character recognition operation on each of the adjusted objects (i.e., the adjusted ROIs) using the character detection module to obtain a recognized character for the corresponding character object. It is noted that, in other embodiments, the character recognition operation may be done using a recognition module (which may also be trained using mask R-CNN) that is different from the character detection module discussed herein.

It is noted that, in some embodiments, the first processor 24 further determines if the skew angle (θ) is zero or non-zero in step 222, and when it is determined in the step 222 that the skew angle (θ) is zero (i.e., the license plate is not skewed), the rotation operation (step 224) may be deemed unnecessary and the flow may proceed to step 226 directly, as exemplified in FIG. 2. In such a case, the character recognition operation may be performed on the third ROIs. In this kind of implementation, the rotation operation is performed only when it is determined in step 222 that the skew angle (θ) is non-zero.

In some embodiments, after the character objects have been recognized respectively as the recognized characters, the first processor 24 may further control a display screen (not depicted in the drawings) to display the recognized character objects and/or to control an audio output (not depicted in the drawings) to output the recognized character objects in an audible manner. In some embodiments, the first processor 24 further controls the first communication component 21 to transmit the recognized character objects to the second electronic device 3, and the second electronic device 3 stores the recognized character objects in the second data storage 32 in step 228.

It is noted that in this embodiment, three different identification modules are utilized to implement the method in a manner known as multilayer heterogeneous recognition for an improved ALPR result. In some embodiments, the first processor 24 may directly implement step 214 to perform the character detection operation on the to-be-processed image using the character detection module without determining the first and second ROIs after the to-be-processed image is captured, and steps 202 to 212 may be omitted.

In the embodiment of FIG. 2, the character recognition operation (step 226) is performed by the first processor 24 of the first electronic device 2. The system 1 is configured as such to implement edge computing (that is, the computations are performed by the first electronic device (s) 2 rather then the second electronic device 3) that may reduce an amount of information that needs to be transmitted over the network 200.

Figure 4A:
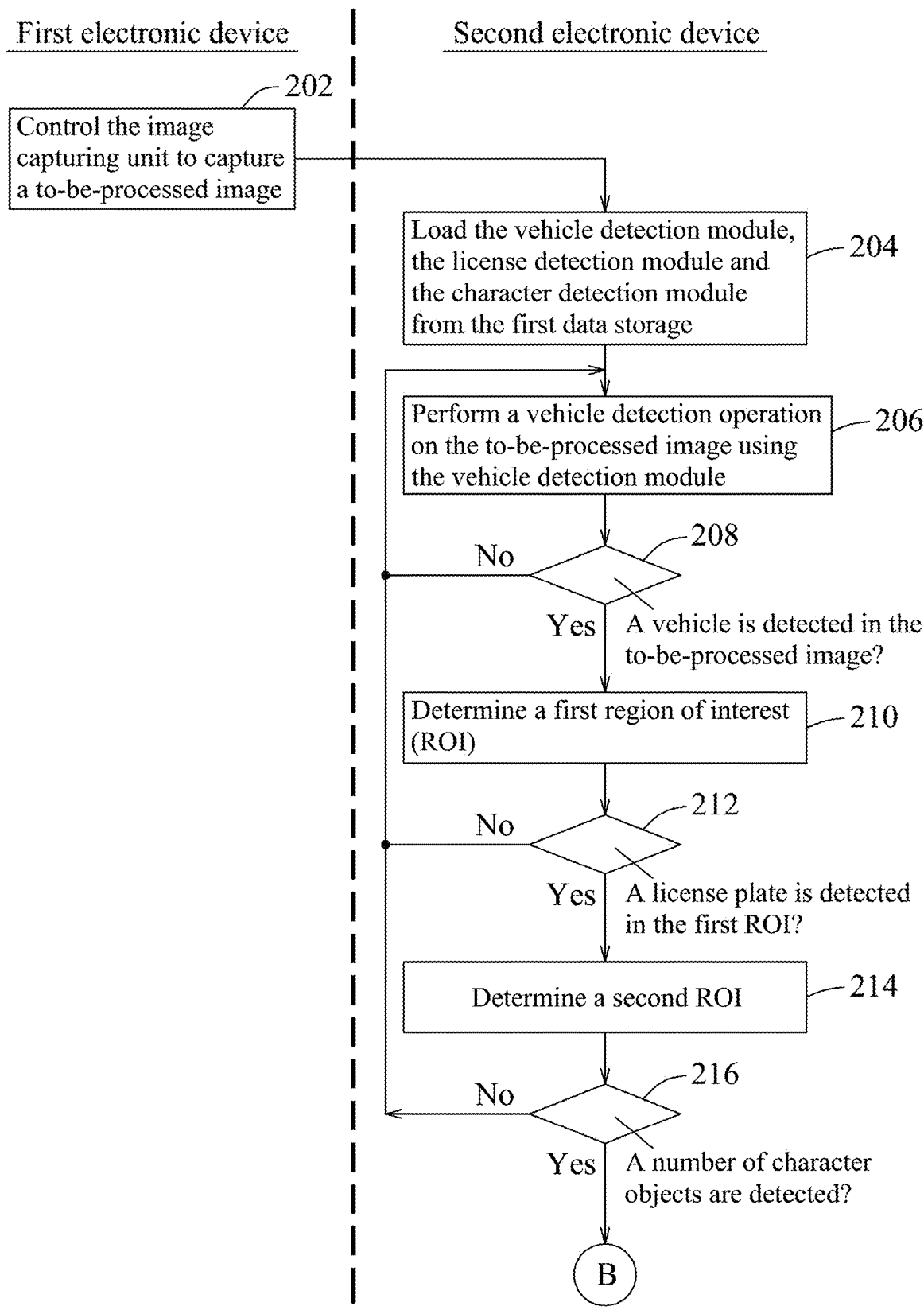
FIG. 4 is a flow chart illustrating steps of a method for performing ALPR according to one embodiment of the disclosure.
Figure 4B:
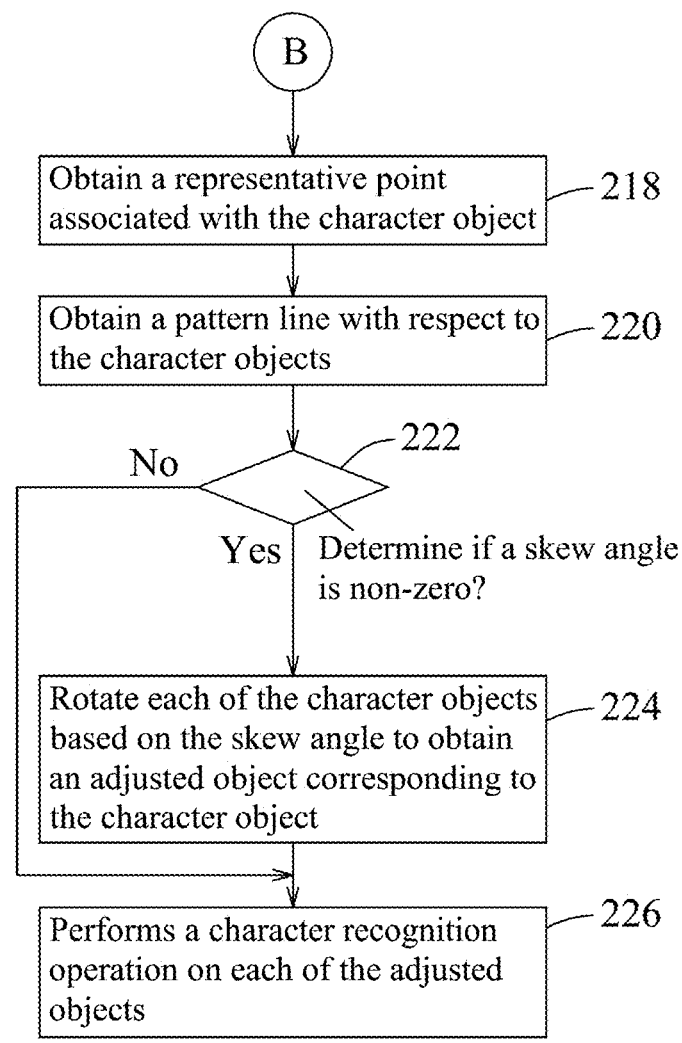

It is noted however that, as shown in FIG. 4, in one embodiment of the disclosure, after the first electronic device 2 captures the to-be-processed image in step 202, the first processor 24 controls the first communication component 21 to transmit the to-be-processed image to the second electronic device 3. Afterwards, the second processor 33 loads the vehicle detection module, the license detection module and the character detection module from the second data storage 32 in step 204, and continues to perform the operations of character recognition as described in steps 206 to 226.

To sum up, the embodiments of the disclosure provide a method and a system for performing ALPR. In the embodiments, after each of the character objects is detected, a pattern line (e.g., a regression line) is calculated to determine whether the license plate of the vehicle is "skewed" in the to-be-processed image. When it is determined that the license plate is skewed, a rotation operation is performed to adjust the character objects for obtaining better recognition result.

In some embodiments, three different identification models are utilized in a multilayer configuration to implement the method in a manner known as multilayer heterogeneous recognition for an improved ALPR result. Specifically, such a configuration may address the difficulties commonly faced in the field of ALPR such as when a color of the license plate is similar to a color of another component of the vehicle or the background, such as when recognition is to be performed at nighttime or in a relatively dim environment, such as when recognition is to be performed on a license plate whose plate body and characters come in multiple different colors, such as when objects resembling certain characters and/or non-license plate objects that include certain characters are in the proximity of the license plate, or such as when the captured image is skewed.

In some embodiments, the operations of character recognition are performed by the first processor 24 of the first electronic device 2 in a edge computing configuration. In such a configuration, the amount of data to be transmitted can be reduced.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for performing automatic license plate recognition, comprising:
 a) performing a character detection operation on a to-be-processed image;
 b) determining whether a number of character objects are detected based on a result of step a);
 c) when the determination of step b) is affirmative, obtaining, for each of the character objects, a representative point associated with the character object;
 d) obtaining a pattern line with respect to the representative points that are associated with the character objects, respectively;
 e) calculating a skew angle formed by the pattern line and a preset reference line;
 f) rotating each of the character objects based on the skew angle to obtain an adjusted object corresponding to the character object; and
 g) for each of the adjusted objects obtained respectively from the character objects, performing a character recognition operation on the adjusted object to obtain a recognized character.

2. The method of claim 1, wherein:
 step c) includes, for each of the character objects, determining a region of interest (ROI) for the character object, and the representative point associated with the character object is a center point of the ROI; and
 in step d), the pattern line is a regression line with respect to the representative points.

3. The method of claim 1, further comprising, prior to step a):
 performing a vehicle detection operation on the to-be-processed image to determine whether a vehicle is detected in the to-be-processed image;
 when it is determined that a vehicle is detected in the to-be-processed image, determining a first region of interest (ROI) of the to-be-processed image, wherein the first ROI includes the vehicle, and performing a license plate detection operation on the first ROI to determine whether a license plate is detected in the first ROI; and
 when it is determined that a license plate is detected in the first ROI, determining a second ROI in the first ROI, wherein the second ROI includes the license plate, and implementing step a) to perform the character detection operation only on the second ROI.

4. The method of claim 1, to be implemented by a system including a first electronic device and a second electronic device, the first electronic device including a first processor, an image capturing unit and a first communication component, the second electronic device including a second processor, a data storage and a second communication component that is in communication with the first communication component, the method further comprising:

prior to step a), controlling, by the first processor, the image capturing unit to capture the to-be-processed image; and transmitting, by the first electronic device, the to-be-processed image to the second electronic device;

wherein steps a) to g) are implemented by the second processor of the system.

5. The method of claim 1, to be implemented by a system including a first electronic device and a second electronic device, the first electronic device including a first processor, an image capturing unit and a first communication component, the second electronic device including a second processor, a data storage and a second communication component that is in communication with the first communication component, wherein:

the method further comprises, prior to step a), controlling, by the first processor, the image capturing unit to capture the to-be-processed image;

steps a) to g) are implemented by the second processor of the system; and the method further comprises, after step g), by the first electronic device, transmitting to the second electronic device the recognized characters obtained respectively for the adjusted objects.

6. An electronic device for performing automatic license plate recognition, comprising a processor that is programmed to:

perform a character detection operation on a to-be-processed image;

determine whether a number of character objects are detected based on a result of the character detection operation, and, when the determination is affirmative, obtain, for each of the character objects, a representative point associated with the character object;

obtain a pattern line with respect to the representative points that are associated with the character objects, respectively;

calculate a skew angle formed by the pattern line and a preset reference line;

rotate each of the character objects based on the skew angle to obtain an adjusted object corresponding to the character object; and for each of the adjusted objects obtained respectively from the character objects, performing a character recognition operation on the adjusted object to obtain a recognized character.

7. The electronic device of claim 6, wherein said processor is programmed to:

for each of the character objects, determine a region of interest (ROI) for the character object, and the representative point associated with the character object is a center point of the ROI; and wherein the pattern line is a regression line with respect to the representative points.

8. The electronic device of claim 6, wherein said processor is further programmed to, prior to performing the character detection operation:

perform a vehicle detection operation on the to-be-processed image to determine whether a vehicle is detected in the to-be-processed image;

when it is determined that a vehicle is detected in the to-be-processed image, determine a first region of interest (ROI) of the to-be-processed image, wherein the first ROI includes the vehicle, and perform a license plate detection operation on the first ROI to determine whether a license plate is detected in the first ROI; and when it is determined that a license plate is detected in the first ROI, determine a second ROI in the first ROI, wherein the second ROI includes the license plate, and perform the character detection operation only on the second ROI.

9. The electronic device of claim 6, further comprising a communication component for receiving the to-be-processed image.

10. The electronic device of claim 6, further comprising an image capturing unit for capturing the to-be-processed image.

* * * * *